United States Patent [19]
Le Grand

[11] 3,716,857
[45] Feb. 13, 1973

[54] A NAVIGATION SYSTEM UTILIZING PULSE TIMING

[75] Inventor: Jesse S. Le Grand, Clifton, N.J.

[73] Assignee: International Telephone and Telegraph Corporation, Nutley, N.J.

[22] Filed: Nov. 27, 1970

[21] Appl. No.: 93,209

[52] U.S. Cl............343/6.8 LC, 324/181, 343/17.1 R
[51] Int. Cl..................................................G01s 7/28
[58] Field of Search.........343/6.8 R, 6.8 LC, 17.1 R; 324/181

[56] References Cited

UNITED STATES PATENTS 2,777,059  1/1957  Stites...................................343/6.8 R Primary Examiner—T. H. Tubbesing
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

In a TACAN navigation system where the received interrogate signals are pulse pairs of substantially equal amplitude, but the amplitude of different pairs may vary widely, pulse timing is utilized to generate response signals. To provide apparatus which is capable of determining the time of arrival of each interrogate pulse regardless of amplitude, the pulses are provided to a plurality of serially connected IF amplifiers, and a half amplitude finder, responsive within selected amplitude limits, is connected to the output of each of said amplifiers, the output of the half amplitude finders providing a timing pulse related to the time of arrival of each of the interrogate pulses.

7 Claims, 2 Drawing Figures

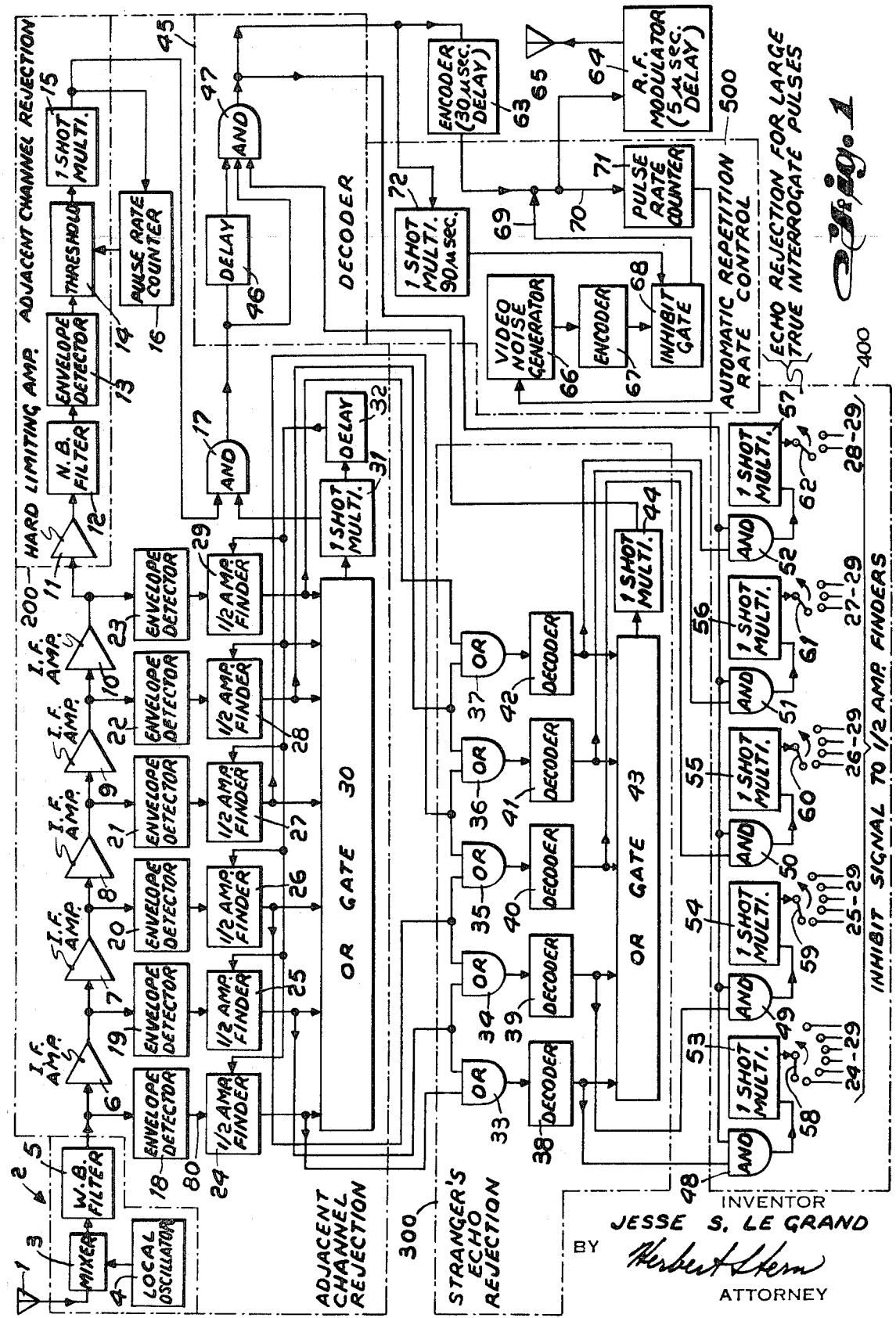

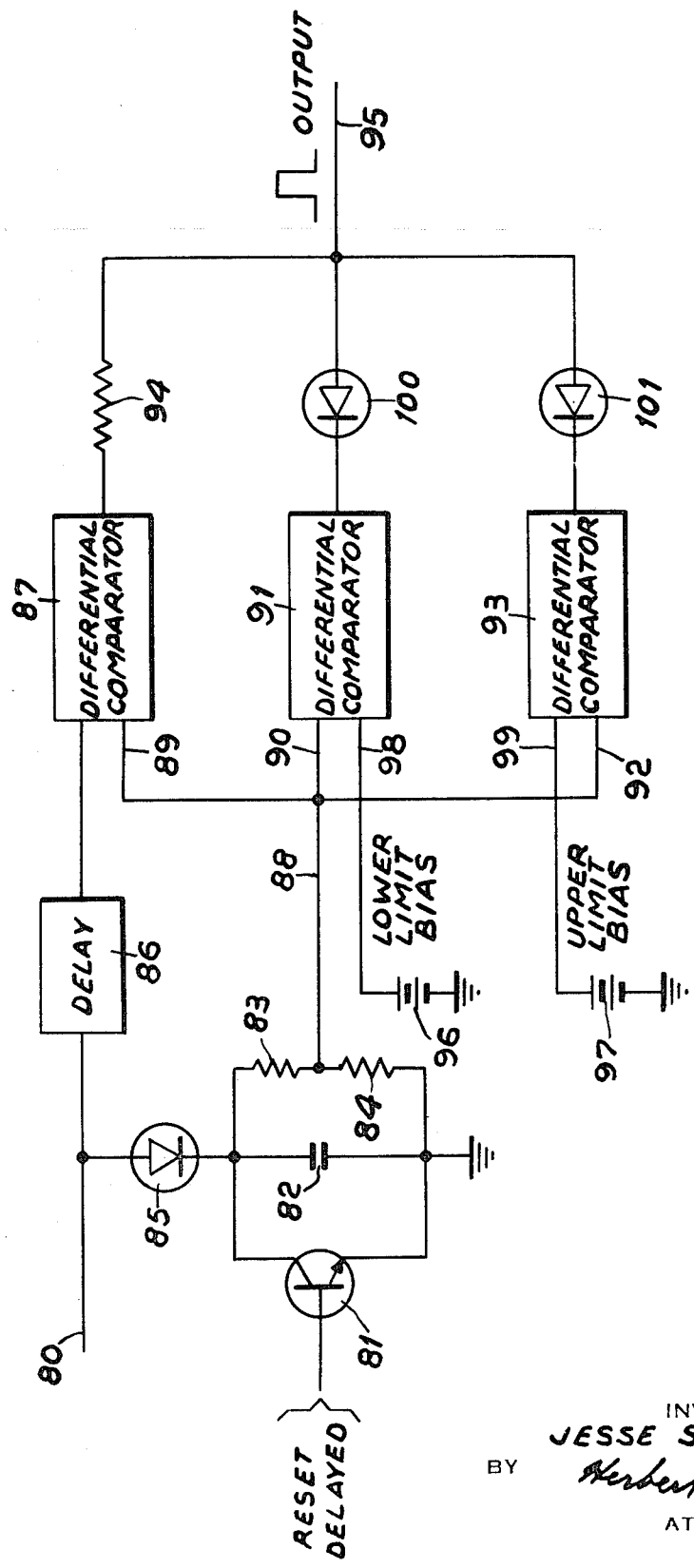

A NAVIGATION SYSTEM UTILIZING PULSE TIMING

BACKGROUND OF THE INVENTION

This invention relates to pulse timing apparatus and more particularly to pulse timing apparatus for a navigation system station receiving pulse groups.

Receivers for navigation equipment often operate on pulse groups, e.g. TACAN operates on pulse pairs. In such systems the amplitude of each pulse of a pulse pair is substantially the same, as being from a fixed source (an aircraft). Many aircraft, however, will transmit to, and receive signals from, a single TACAN beacon or ground station. For this reason, the pulses of pulse pairs transmitted from different planes will vary widely in amplitude, as some transmitters (aircraft) will be much closer to the TACAN antenna than others. For the required navigation information to be obtained, it is necessary that various operations be performed on the pulses received by the navigation equipment. For example, to accomplish precision distance measurement, which is a function of TACAN, an elapsed time measurement must be made, and it is therefore necessary that some portion of a received DME (distance measuring equipment) interrogate pulse be precisely selected and defined in order to give some precise point from which to measure. In TACAN, the half amplitude point of one of the pulses has been selected for this purpose, and the instant invention is applicable for use with a system wherein the half amplitude point of the first pulse of the pulse pair has been selected. The location of the half amplitude point of the first pulse of a pair is made difficult by the particular TACAN requirement that the operation be performed for input carrier variations exceeding 80db. Further, the ground station must have good adjacent channel splatter rejection and good echo rejection.

Prior art systems operate primarily on the principle of second pulse timing, utilizing the first pulse of a pair to set the gain of an amplifier operating on the second pulse of the pair, and even these systems have serious deficiencies. For example, those systems which utilize linear amplifiers, with grid-leak biasing for AGC are deficient in that they are incapable of accurate response when large, rapid variations in gain are required where a TACAN station is being interrogated by a large number of aircraft.

The utilization in prior art systems of logarithmic IF amplifiers has the deficiency that practical logarithmic amplifiers have a residual error due to the variations in the $E_{out} = K log E_{in}$ characteristic as a function of $E_{in}$.

For achieving good adjacent channel splatter rejection and good echo rejection, most prior art systems utilize what is commonly known as a Ferris circuit (or Ferris discriminator). The disadvantages of a system utilizing a Ferris circuit are that such discriminators are difficult to align and that optimum system noise bandwidths are not easily obtained, thus causing less than maximum sensitivity.

SUMMARY OF THE INVENTION

Therefore, the main object of this invention is to provide a pulse timing apparatus which is responsive to pulses rapidly varying in amplitude over a wide amplitude range.

It is a further object of this invention to provide such a pulse timing apparatus with optimum system noise bandwidth, thus providing maximum sensitivity.

It is a feature of this invention to provide such a pulse timing apparatus which is adaptable for use with a navigation system station receiving pulse groups on a specified channel and responding thereto.

According to the present invention there is provided pulse timing apparatus comprising means for receiving a plurality of randomly spaced pulses at least some of which have different amplitudes, a plurality of serially connected amplifiers receiving and amplifying said pulses, and a plurality of means, each coupled to the output of one of said amplifiers and responsive, within selected amplitude limits, to said amplified pulses, for determining the time of arrival of each of said plurality of pulses.

Further objects and features of this invention will become more apparent by reference to the following description taken in conjunction with the accompanying drawings in which:

BRIEF DESCRIPTION OF THE DRAWINGS

FIG. 1 is a block diagram of an arrangement according to the invention; and

FIG. 2 is a schematic diagram illustrating one of the blocks shown in FIG. 1.

DESCRIPTION OF THE PREFERRED EMBODIMENT

Referring to FIG. 1, there is shown a pulse timing apparatus for use with a navigation system station receiving pulse groups and responding thereto, such navigation systems including Tacan and the like. The system includes an antenna 1 receiving RF pulses which are demodulated and filtered by a receiver 2 which includes a mixer 3, local oscillator 4 and wideband filter 5. The IF signals appearing at the output of receiver 2 are provided as inputs to a plurality of IF amplifiers 6-10, these amplifiers having the characteristics that, when overdriven, their output does not decrease below their maximum output amplitude; this feature is obtained in a manner well known in the art by utilizing emitter coupled transistor pairs. The output of IF amplifier 10 is coupled to the combination of hard limiting amplifier 11, narrow band filter 12, envelope detector 13, threshold network 14 and one shot multivibrator 15, the purpose of this circuitry being to provide an output signal when an "on" channel signal, that is when a pulse on a specified channel, is received via antenna 1. The pulse output of one shot multivibrator 15 is provided to pulse rate counter 16 which in turn sets the threshold response level of threshold circuit 14. The output of one shot multivibrator 15 is also applied to AND gate 17.

Connected to the output of wideband filter 5 and to the output of each of IF amplifiers 6-10 are envelope detectors 18-23 of a type well known in the art. The output of envelope detectors 18-23 is applied to half amplitude finders 24-29, respectively, and the output from each of the half amplitude finders 24-29, which will be discussed with regard to FIG. 2, are applied to OR gate 30, the output of which is provided to one shot multivibrator 31, the output of one shot multivibrator 31 in turn being an input to AND gate 17. The pulse output of one shot multivibrator 31 is also provided, through delay network 32 to each of the half amplitude finders 24-29 in a manner and for a purpose which will be discussed below.

The output signals from half amplitude finders 24-29 are further provided to the inputs of OR gates 33-37, the input to each OR gate being the output signal from two adjacent half amplitude finders. Thus, for example, the input to OR gate 35 is from half amplitude finders 26 and 27 and the input to OR gate 36 is from half amplitude finders 27 and 28. OR gates 33-37 are in turn coupled to decoders 38-42, respectively, of a type well known in the art, one example of which will be discussed below. The output from decoders 38-42 are provided to OR gate 43 which is connected to one shot multivibrator 44.

AND gate 17 is connected to decoder or verifying circuit 45 which includes delay 46 and AND gate 47; AND gate 47 responding to the simultaneous occurrence of a signal from delay network 46, AND gate 17 and one shot multivibrator 44.

Decoders 38-42 are of the same design as decoder 45 and each includes a delay network and an AND gate as illustrated with regard to decoder 45.

The output of the decoders 38-42 are each coupled to AND gates 48-52, respectively, as is the output of AND gate 47. The output of AND gates 48-52 are each connected to one shot multivibrators 53-57, respectively, which in turn are connected to switches 58-62, these switches being in turn coupled to half amplitude finders 24-29, respectively.

The output from AND gate 47 is also coupled to encoder 63 which has a 30 microsecond delay and from the encoder to an RF modulator 64 having a 5 microsecond delay, the output of the RF modulator 64 being provided to output antenna 65 from which it is transmitted to an interrogating aircraft. In order to provide a substantially constant output pulse rate regardless of the pulse output rate from AND gate 47, a video noise generator 66 is provided, the video noise generator being connected to encoder 67. The output of encoder 67 is coupled, through inhibit gate 68 via conductor 69 to the output of encoder 63 and the input of RF modulator 64. The pulses reaching RF modulator 64 are coupled, via conductor 70, to pulse rate counter 71 where they are counted. Counter 71 is in turn coupled to video noise generator 66 for controlling the output thereof.

The output pulses from AND gate 47 are further provided to one shot multivibrator 72 and the output of one shot multivibrator 72 is provided to inhibit gate 68 for preventing any pulses from inhibit gate 68 from reaching RF modulator 64 at the same time that pulses are transmitted from encoder 63, thereby interferring with these pulses from encoder 63.

Referring now to FIG. 2, there is shown a half amplitude finder of the type shown in FIG. 1 and numbered 24-29. An input pulse, for example from envelope detector 18 is provided on line 80 to the parallel combination of transistor 81, capacitor 82, and series resistors 83 and 84 through diode 85. The signal from envelope detector 18 is also provided to the delay network 86 and from there to differential comparator 87. The input signal on line 80 passes through diode 85 and charges capacitor 82 to the peak value of the input signal pulse. By setting the values of resistors 83 and 84, any desired proportion of the peak value of the signal can be provided on line 88. In the instant case where the half amplitude point of the input pulse is the point of interest, the resistance of resistors 83 and 84 will be equal. This proportional value on line 88 is provided to input 89 of differential comparator 87, to line 90 of differential comparator 91, and to line 92 of differential comparator 93.

The delayed pulse signal on line 80 transmitted from delay network 86 to differential comparator 87 is compared in comparator 87 to the half amplitude signal applied to input 89 and when the pulse from delay network 86 exceeds the magnitude of the half amplitude voltage, a positive going output pulse is provided through resistor 94 to output terminal 95, the output pulse terminating when the pulse applied to comparator 87 from delay 86 decreases in amplitude so that the half amplitude signal applied at input 89 exceeds the magnitude of said delayed pulse.

To provide such a half amplitude finder which will respond to input signals only within selected amplitude limits, upper and lower limit inhibit circuitry is utilized. Means for providing a bias signal, for example batteries 96 and 97 providing a lower limit bias and upper limit bias respectively, are applied to input terminals 98 and 99 of differential comparators 91 and 93, respectively, and the outputs of comparators 91 and 93 are coupled to output terminal 95 through diodes 100 and 101, respectively. When an input signal pulse appears on line 80 and the amplitude of the pulse is greater than twice the upper amplitude limit of the half amplitude finder, it is seen that the proportional (half) amplitude level applied on line 92 will be greater than the upper limit bias signal applied to input terminal 99. Therefore, the output level of comparator 93 will be below that at output terminal 95, diode 101 will conduct and the amplitude of the output pulse appearing at terminal 95 will not be allowed to rise above the level of the output of differential comparator 93 due to the conduction of diode 101. In a similar manner, if the input pulse appearing on line 80 has an amplitude less than twice the lower amplitude limit to which the half amplitude finder is designed to respond, then the half amplitude level existing on line 88 is applied to input terminal 90 of comparator 91 and the amplitude of the signal at input terminal 90 will not exceed the amplitude of the bias signal applied to comparator 91 at input terminal 98. As previously discussed with regard to the signal exceeding the upper limit of the half amplitude finder, here too the output of comparator 91 will be a low level output causing diode 100 to conduct and prevent the output signal at terminal 95 from exceeding the level of the output signal of comparator 91.

Thus, only when the desired proportional amplitude (in this case the half amplitude) of the input signal on line 80 lies both below the upper limit bias level and above the lower limit bias level will the outputs of comparators 91 and 93 remain high thereby preventing diodes 100 and 101 from going to their conducting state and thus allowing the pulse appearing at output terminal 95 to rise to the level dictated by comparator 87.

The operation of the circuit illustrated in FIG. 1 will now be described. A pair of interrogate pulses from an aircraft having substantially the same amplitude and being separated by 12 microseconds (a Tacan requirement), and appearing on a specified channel will arrive at antenna 1 where they will be demodulated in receiver 2. The first pulse of the pair, now an IF signal, is provided to the IF amplifiers 6–10 where it is serially amplified. The pulse appearing at the output of wideband filter 5 and the serially amplified pulses appearing at the outputs of the IF amplifiers are applied to envelope detectors 18–23, respectively. The detected pulses are now applied to half amplitude finders 24-29. Due to the fact that these half amplitude finders have upper and lower response limits, only one, or at most two adjacent half amplitude finders will have an output. The remaining half amplitude finders have no output since the signal is either beneath or above the limits imposed on the finders. Thus, for example, if a very large Tacan pulse appears, half amplitude finder 24 will have an output, but after only one stage of amplification, in IF amplifier 6, its amplitude will exceed the upper limit of half amplitude finder 25 and obviously will exceed the upper limits of the remaining half amplitude finders 26–29 since the signals to these half amplitude finders have been amplified even further by IF amplifiers 7–10. On the other hand, assume that a very small Tacan pulse appears at the output of wideband filter 5. In this case, half amplitude finders 24–28 will not have outputs since even after four stages of IF amplification, i.e. after passing through IF amplifiers 6–9, the pulse magnitude will still be below the lower limit of the half amplitude finders and only after a fifth stage of amplification in amplifier 10 will the signal exceed the lower limit set for the finders.

Since the output of each half amplitude finder, the output being termed a timing pulse, is connected to OR gate 30, an output from any one will trigger one shot multivibrator 31 and thereby provide a pulse related in time to the time of arrival of the pulse at antenna 1.

The output of one shot multivibrator 31 is at this time transmitted via delay network 32 to the base of transistor 81 illustrated in FIG. 2. Upon receipt of this pulse, transistor 81 conducts, discharging capacitor 82 and thereby prepares half amplitude finder 24 for the next pulse in time, in this case, the second pulse of the pulse pair. The delayed output of multivibrator 31 is also applied, as shown in FIG. 1, to half amplitude finders 25–29, in the same manner as discussed with regard to finder 24, with a similar resetting effect. The output of one shot multivibrator 31 is also applied to one input of AND gate 17.

In order to provide a pulse indicating the occurrence of an "on" channel pulse at antenna 1, the output of IF amplifier 10 is provided to the combination of hard limiting amplifier 11 and narrow band filter 12, amplifier 11 being of the type which is hard limiting on noise, i.e. it always provides the maximum output power of which it is capable. The operation of the hard limiting amplifier and the narrow band filter as an adjacent channel rejection circuit is completely disclosed in U.S. Pat. No. 3,375,514 entitled *Receiving System for Radio Navigation System* and issued Mar. 26, 1968 to the assignee of the subject invention. The operation of this circuit will therefore not be further discussed. The pulse output from narrow band filter 12 is then provided to an envelope detector, threshold circuit and a one shot multivibrator, the one shot multivibrator 15 providing an output pulse when the pulse received at antenna 1 is "on" the specified channel. For simplicity, the network comprising amplifier 11, filter 12, detector 13, threshold 14, and multivibrator 15 will be referred to as adjacent channel rejection network 200. The output pulse from one shot multivibrator 15 is applied to another input of AND gate 17 which simultaneously receives the output of one shot multivibrator 31. The output from AND gate 17 is provided to delay network 46 and AND gate 47. The pulse output from AND gate 17 is stored in the delay network 46, which may be a standard shift register. It will be noted, however, that AND gate 47 will not at this time have an output since no input is received from delay network 46 nor from one shot multivibrator 44, the other two inputs to AND gate 47.

Returning for a moment to the output of one shot multivibrator 15, it is noted that the output of one shot multivibrator 15 is applied to pulse rate counter 16 which is used to set the threshold level of threshold circuit 14, this arrangement providing for a desired responsiveness to noise by the adjacent channel rejection network 200.

Turning again to the operation of the beacon, it was noted that AND gate 47 would not have an output after the occurrence of the first pulse of the TACAN pair. The second pulse of the TACAN pair now occurs, after a delay of 12 microseconds, and the same sequence of events as discussed with regard to the first pulse of the pair will occur, i.e. adjacent channel rejection network 200 will provide one input to AND gate 17 as will one shot multivibrator 31, the output of AND gate 17 will again be provided to delay network 46 and to AND gate 47. Thus, AND gate 47 will have two inputs, one due to the first pulse of the TACAN pair from delay network 46 and the second due to the second pulse of the TACAN pair from AND gate 17. At this point, AND gate 47 would have an output if it were not for the requirement of a third input to AND gate 47 from one shot multivibrator 44. This last required input will be discussed below and it will be assumed for the moment that the two aforementioned input pulses to AND gate 47 are sufficient to activate the AND gate and provide an output therefrom said output being termed a verifying pulse. The output or verifying pulse from AND gate 47 is applied to output or response network 500. It is applied first to encoder 63 which has a delay of 30 microseconds and after encoding, the pulse is provided to RF modulator circuit 64 having a 5 microsecond delay. The output of the RF modulation circuit 64 is provided to antenna 65 from which it is transmitted to interrogating aircraft. Thus, elapsed time, and therefore distance, information, based on a precise knowledge of the time of arrival of an interrogate pulse is transmitted to an interrogating aircraft.

It is a requirement of TACAN that 2,700 pulse pairs, termed squitter, be provided from antenna 65 to the interrogating aircraft for the purpose of providing information, other than distance, to the interrogating aircraft, i.e. information such as directional information. To this end there is provided video noise generator 66 which provides noise pulses to encoder 67 and to inhibit gate 68. The output of inhibit gate 68 is coupled by conductor 69 to the output of encoder 63 and the input of RF modulator 64. The pulses provided from AND gate 47 are tapped at the output of encoder 63 by conductor 70 and are applied to pulse rate counter 71. The pulse rate counter, counting the total pulses being applied to RF modulator 64 feeds back information to the video noise generator 66 controlling the number of noise pulse outputs, thereby insuring that a constant number of pulses, in this case 2700 pulse pairs per second, are transmitted by antenna 65. To insure that pulses from AND gate 47 are transmitted from antenna 65 without confusion with or interference from the video noise generator, i.e. without interference by the squitter pulses, a one shot multivibrator 72 responds to output pulses from AND gate 47, the one shot multivibrator having a pulse output duration of 90 microseconds and being provided at an input to the inhibit gate 68, thereby preventing any pulses from the video noise generator from being transmitted via conductor 69 to the input of RF modulator 64. Simple calculations will show that due to the operation of one shot multivibrator 72, no squitter pulses are transmitted by antenna 65 for a period beginning 35 microseconds prior to the transmission of a true response pulse, i.e. one related to the output of AND gate 47, and continuing for a period of 55 microseconds after the true response pulse has been transmitted by antenna 65.

The response signal transmitted from antenna 65 to the interrogating aircraft will include information concerning the distance of the aircraft from the beacon, and further, information which may be utilized by the aircraft to determine its angular relation with the beacon.

Although the above-discussed circuitry will provide satisfactory response signals to interrogating aircraft in a TACAN system, additional circuitry has been illustrated in FIG. 1, the purpose of which is to overcome difficulties encountered due to site location of TACAN ground stations. One problem arises from the fact that pulses other than true TACAN pulse pairs are received at antenna 1, as are echo pulses. For example, it is possible that a radar unit in the vicinity of the TACAN ground station will transmit a pulse which coincidentally gives rise to an echo pulse occurring 12 microseconds later. Clearly, these two pulses will pass through the envelope detectors and half amplitude finders providing an output from one shot multivibrator 31, and will also provide an output from one shot multivibrator 15 in adjacent channel rejection network 200, if the pulse is "on" channel. However, it is clear that it is desired that the TACAN beacon not respond to these pulses since it is not truely an interrogate pulse from an aircraft. For this purpose what will be termed the "stranger's pulse and echo" rejection network 300 is provided, the network including OR gates 33–37, decoders 38–42, OR gate 43 and one shot multivibrator 44. In the operation of this network 300 one assumption is made, that the echo of the "stranger's pulse" will be substantially attenuated in amplitude from the original "stranger's pulse." The first of the "stranger's pulses" will provide an output from the half amplitude finder suitable to the input amplitude of the stranger's pulse and from there to the two OR gates coupled to the half amplitude finder. These two OR gates will provide inputs to their corresponding decoders where the pulse is stored in a delay network similar to delay network 46. When the echo of the stranger's pulse arrives at antenna 1 12 microseconds later, it will cause an output from the half amplitude finder responsive to an input pulse having the amplitude of the stranger's echo. However, the latter half amplitude finder will be removed at least two stages from the half amplitude finder through which the stranger's original pulse passed due to the difference in amplitude between the original pulse and its echo. The output from the half amplitude finder responding to the echo pulse will also be provided to its two corresponding OR gates and to the two decoders associated with these last-mentioned OR gates, but it will be seen that the two decoders receiving inputs due to the echo pulses will not have any commonality with the two decoders which receive inputs due to the stranger's original input pulse. Thus, none of the decoders will have an output and OR gate 43 will not trigger one shot multivibrator 44. Due to this, there will be no input to AND gate 47 from one shot multivibrator 44 and the TACAN beacon will therefore not respond to pulses which are "on" channel and have 12 microsecond spacing between them unless the two pulses also have substantially equal amplitudes. If, however, a true TACAN pulse pair has been received, the same half amplitude finder, or, at the least, adjacent half amplitude finders will respond to the first and second pulses of the pulse pair due to the fact that they are of substantially equal amplitude, and therefore the two decoders coupled to the output of the half amplitude finder will receive two pulses separated in time by 12 microseconds. These decoders each will therefore provide a signal, which may be termed a decode signal, to OR gate 43 which will actuate one shot multivibrator 44 thereby providing the required third input to AND gate 47, and AND gate 47 will thus provide a verifying pulse output to encoder 63 only when two consecutive "on" channel pulses separated by 12 microseconds have been received and when these two pulses have substantially equal amplitudes.

Additional echo problems with TACAN beacons arise due to the site location of these beacons. For example, true interrogate pulses from aircraft may also generate echoes which will be received by antenna 1 as much as 200 to 300 microseconds after the receipt of the original interrogate pulses and these echo pulses will be separated in time by 12 microseconds since they are the echoes of a true TACAN pair. Further, they will be of substantially equal amplitude since it is assumed they will have been attenuated to the same degree by virtue of their having been reflected from the same object and having taken the same path from the aircraft to antenna 1. Therefore, network 400, which may be termed an "echo rejection network for true interrogate pulses" has been provided and this network comprises AND gates 48–52, one shot multivibrators 53–57 and switches 58–62, these switches being connected to half amplitude finders 24–29 as indicated. Thus, if a large true interrogate pulse arrives at antenna 1, it passes through half amplitude finder 24, decoder 38 and AND gate 48 (the other input to AND gate 48 being discussed below) to one shot multivibrator 53 which actuates switch 58. Switch 58 will thereupon deactivate all of the half amplitude finders 24–29 for a predetermined selected period of time inhibiting the system as a whole from responding to any further pulse inputs thereby insuring that the system will not respond to an echo of this true interrogate pulse. On the other hand, if a low amplitude true interrogate pulse pair was received by antenna 1, it would pass, for example, through half amplitude finder 29, through decoder 42, through AND gate 52 and one shot multivibrator 57, actuating switch 62. This would in turn deactivate only half amplitude finders 28 and 29. It is assumed that this will be sufficient since if a pulse larger than the true interrogate pulse is subsequently received it is assumed that it is another true interrogate pulse rather than an echo of the original interrogate pulse and therefor a response thereto should be provided.

It will be seen that the output from AND gate 47 is also coupled to an input terminal of each of the AND gates 48–52. This is for the purpose of guaranteeing that the half amplitude finders will be inhibited only in response to the action of a true interrogate pulse and not to a random pulse which might occur, since the AND gates in network 400 will only provide an output to their associated one shot multivibrator if a pair of "on" channel pulses separated in time by 12 microseconds and approximately equal amplitude have been received.

It is thus seen that there has been provided a navigation system station for receiving pulse groups on a specified channel and responding thereto, said station comprising means for receiving a plurality of randomly spaced pulse groups having different amplitudes, the pulses of each group being of substantially equal amplitude and occurring at selected intervals, means coupled to said receiving means for providing a timing pulse related to the time of reception of each of said pulses, means coupled to receive said timing pulse for providing a decode signal when each pulse of a group is of a substantially equal amplitude and occurs at said selected intervals, means coupled to receive said decode signal for inhibiting said timing pulse means for a predetermined period of time after the occurrence of said decode signal, means responsive to said plurality of pulses providing a on-channel signal in response to the reception of a pulse on said specified channel, verifying means responding to the simultaneous occurrence of said on-channel signal, said timing pulse, and said decode signal for providing a verifying pulse, and means coupled to receive said verifying pulse for providing an output signal corresponding thereto, said output signal means further including means for providing output signals at a substantially constant rate.

While I have described above the principles of my invention in connection with specific apparatus, it is to be clearly understood that this description is made only by way of example and not as a limitation to the scope of my invention as set forth in the objects thereof and in the accompanying claims.

I claim:

1. Pulse timing apparatus comprising:
   means for receiving a plurality of randomly spaced pulses at least some of which have different amplitudes;
   a plurality of serially connected amplifiers receiving and amplifying said pulses; and
   a plurality of means, each coupled to the output of one of said amplifiers and responsive, within selected amplitude limits, to said amplified pulses, for determining the time of arrival of each of said plurality of pulses,
   wherein each of said time determining means comprises:
   means for storing the peak value of said each pulse;
   means coupled to said storage means for providing a signal which is a selected proportion of said stored peak value;
   delay means receiving said pulse and transmitting it after a selected period of time;
   means responsive to said delayed pulse and said signal for providing a timing pulse when the magnitude of said delayed pulse exceeds the magnitude of said signal; and
   limit means responsive to said signal for inhibiting said timing pulse when the magnitude of said signal lies outside said selected limits.

2. Pulse timing apparatus, according to claim 1, wherein said limit means comprises:
   an upper limit bias voltage;
   a lower limit bias voltage;
   a first differential comparator responsive to said signal and to said upper limit bias voltage for providing a first switching signal when said signal magnitude exceeds said upper limit bias voltage;
   first switching means responsive to said first switching signal coupled to said means providing said timing pulse for inhibiting said timing pulse;
   a second differential comparator responsive to said signal and said lower limit bias voltage providing a second switching signal when said signal magnitude is less than said lower limit bias voltage; and
   second switching means responsive to said second switching coupled to said means providing said timing pulse signal for inhibiting said timing pulse.

3. Pulse timing apparatus, according to claim 1, further comprising:
   means coupled to each of said time determining means for providing a trigger pulse in response to a timing pulse from any of said time determining means; and
   delay means coupling said trigger pulse to said storage means for discharging said stored peak value prior to the occurrence of the next pulse of said plurality of pulses.

4. Pulse timing apparatus comprising:
   means for receiving a plurality of randomly spaced pulses at lease some of which have different amplitudes;
   a plurality of serially connected amplifiers receiving and amplifying said pulses; and
   a plurality of means, each coupled to the output of one of said amplifiers and responsive, within selected amplitude limits, to said amplified pulses, for determining the time of arrival of each of said plurality of pulses,
   wherein said plurality of pulses comprise a plurality of pulse groups, the pulses comprising each group being of substantially equal amplitude and separated by selected intervals of time, and wherein the response of said time determining means is a timing pulse, further comprising a plurality of decoder means, each coupled to one of said plurality of time determining means for receiving the response therefrom and providing a decode signal when at least two consecutive response pulses, occurring at said selected interval, are received.

5. Pulse timing apparatus, according to claim 4, wherein each of said decoder means comprises:
means for delaying the response from the time determining means to which the decoder is coupled for said selected interval; and
an AND gate coupled to receive the response from the time determining means to which the decoder is coupled and from said delaying means.

6. Pulse timing apparatus comprising:
means for receiving a plurality of randomly spaced pulses at least some of which have different amplitudes;
a plurality of serially connected amplifiers receiving and amplifying said pulses; and
a plurality of means, each coupled to the output of one of said amplifiers and responsive, within selected amplitude limits, to said amplifier pulses, for determining the time of arrival of each of said plurality of pulses, wherein said time determining means provide a timing pulse indicating the time of arrival of each of said plurality of pulses, further including means for providing a substantially constant rate pulse output comprising:
an output terminal;
means linking said time determining means to said output terminal;
a pulse source coupled to said output terminal;
means coupled to said time determining means and said pulse source for counting said timing pulses and controlling the output rate of said pulse source in response thereto.

7. Pulse timing apparatus, according to claim 6, further comprising:
gate means coupling said pulse source to said output terminal; and
control means responsive to said timing pulses controlling said gate means for preventing the reception of pulses from said source at said output terminal for a chosen time interval after the occurrence of a timing pulse.

* * * * *